O. A. FRANKE.
RAIL JOINT.
APPLICATION FILED NOV. 26, 1915.
1,176,211.
Patented Mar. 21, 1916.
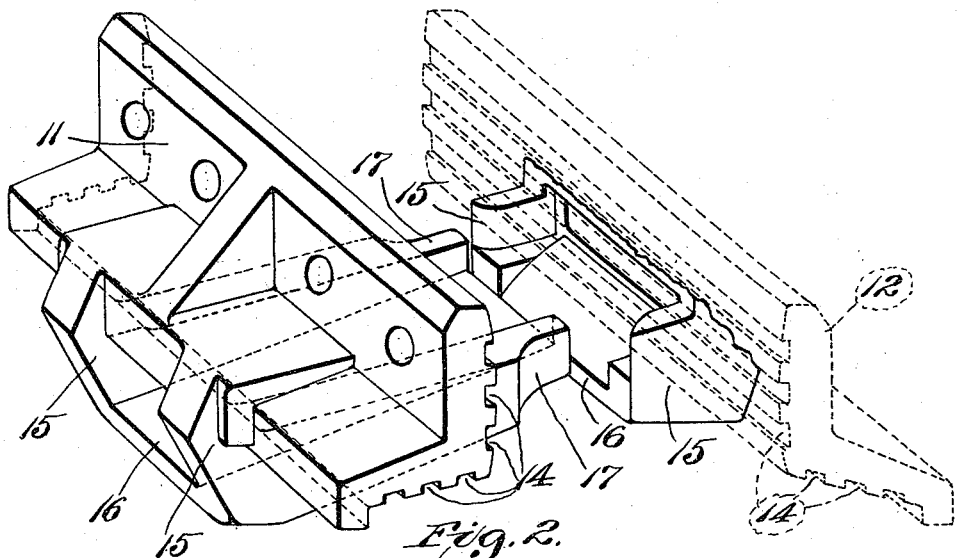
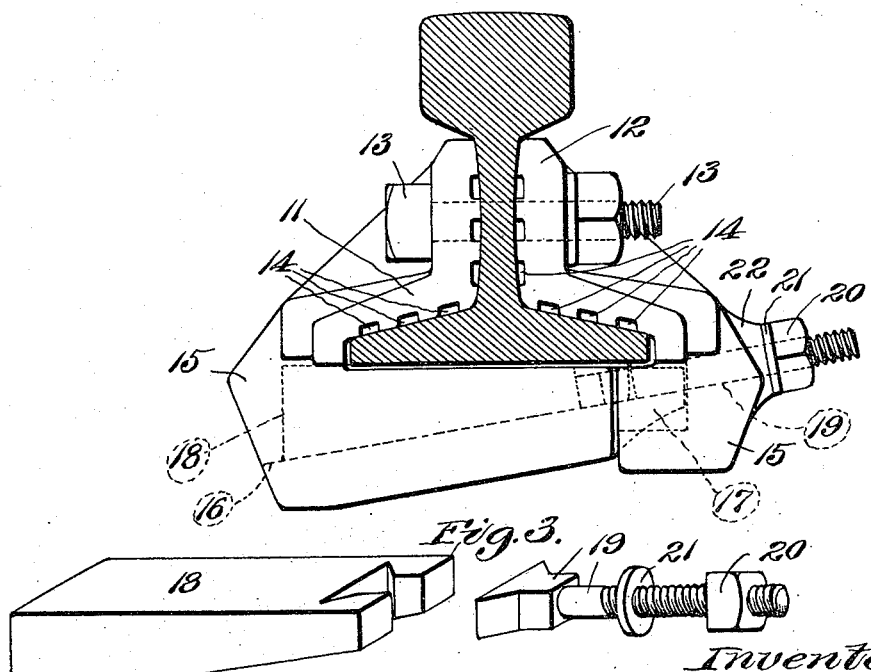
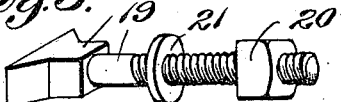

UNITED STATES PATENT OFFICE.

OTTO A. FRANKE, OF ST. LOUIS, MISSOURI.

RAIL-JOINT.

1,176,211.  Specification of Letters Patent.  Patented Mar. 21, 1916.

Application filed November 26, 1915. Serial No. 63,433.

*To all whom it may concern:*

Be it known that I, OTTO A. FRANKE, a citizen of the United States, and a resident of the city of St. Louis and State of Missouri, have invented a new and useful Improvement in Rail-Joints, of which the following is a specification.

This invention relates to rail joints wherein the meeting ends of the rails are connected by fish plates having portions which underlie the bases of the rails and support them between the ties.

The objects of the invention are simplicity, strength, rigidity, durability, adjustability for wear and to slight variations in the fit of the parts, ease of repair and replacement, and low manufacturing cost, in rail joints of the type above described.

The invention consists in a pair of fish plates, one of which has a projection from its lower edge which underlies the meeting ends of the rails and which is supported at its end in a socket in a similar projection from the lower edge of the other fish plate, and a wedge carried by said projections and having a threaded stem extending through the socketed fish plate and drawn up by a nut on its end to fit tightly against the under surfaces of the meeting ends of the rails.

The invention also consists in the shape of the projections and socket, and in the shape and arrangement of the wedge and stem.

Further objects of the invention appear hereinafter in connection with the description of the rail joint shown in the accompanying drawings; and what the invention consists in is more particularly defined in the appended claims.

In the drawings, wherein the same reference characters are used to designate like parts in the several views, Figure 1 is a perspective view of two fish plates embodying the invention, the socketed fish plate being partly broken away, the shape of the part broken away being shown in dotted lines; Fig. 2 is a cross-section of a rail near a joint embodying the invention, showing the parts of the device in end view as adjusted to the rails; and Fig. 3 is a perspective view of a two-piece wedge forming part of the invention.

Referring to the drawings, the fish plates 11, 12 are bolted one on each side of the webs of the rails at their meeting ends by means of bolts 13 in the usual manner. The fish plates have base flanges which rest on the base flanges of the two rails, and the bearing faces of the fish plates have longitudinal grooves 14 running from end to end forming ribs which clamp against the webs and top of the base flanges of the rails.

Each of the fish plates 11 and 12 has two integral downwardly projecting arms 15 near the middle of the outer edge of its base flange, the lower edges of which arms are connected by a transversely sloping bottom 16 integral therewith, forming an inclined seat for the adjusting wedge. The arms 15 and their connecting bottom 16 of each fish plate project under the bases of the rails and meet at their ends. The fish plate 11 has a projecting tongue 17 forming an extension of the seat for the adjusting wedge, which tongue has tapering side walls and bottom fitting in correspondingly tapered recesses in the side walls and bottom of the mating projecting arms of the fish plate 12.

The supporting and adjusting wedge 18 is made with a separable stem 19, connected to the small end of the wedge by means of a dovetail joint or similar connection, whereby either portion of the wedge may be renewed from time to time. The wedge 18 is seated in and supported by the bottom projection of the fish plate 11, and the stem 19 is seated in and supported by the bottom projection of the fish plate 12. The two-part construction of the wedge and stem enables each part to accommodate itself to the member in which it is supported. The outer end of the stem 19 is threaded and provided with a nut 20 and washer 21 bearing against a seat 22 on the outer edge of the base of the fish plate 12 to draw the wedge tight up against the bottoms of the ends of the rails.

The advantages of the invention are its few parts, the strength and rigidity of the joint formed thereby, and the ease with which the joint bolts and wedge can be kept tightened up and renewed as required.

The invention is not restricted to the precise forms and arrangement of the parts shown and described.

I claim the following as my invention:

1. A rail joint comprising a pair of fish plates, one of which fish plates has a projection from its lower edge provided with a lateral flange which is adapted to underlie the base of the rail and which has an inclined seat for a wedge, and the other of which fish plates has a projection from its lower edge which is provided with a socket, means for supporting the free edge of said lateral flange to support said seat, a wedge arranged on said seat to engage and support the base of the rail, said wedge extending through said socket, and means engaging the outer side of said socketed fish plate for retaining said wedge in adjusted position.

2. A rail joint comprising a pair of mating fish plates, one of which fish plates has a projection from its lower edge which is adapted to underlie the base of the rail and which has an inclined seat for a wedge, and the other of which fish plates has a projection from its lower edge which is provided with a socket adapted to support the end of the projection from the first fish plate, a wedge arranged on said seat to engage the base of the rail, said wedge having a threaded stem extending through said socket and a nut on its end engaging the outer side of said socketed fish plate for retaining said wedge in adjusted position.

3. A rail joint comprising a pair of fish plates, one of which fish plates has a projection from its lower edge with its end adapted to underlie the base of the rail and the other of which fish plates has a projection from its lower edge provided with a socket adapted to support the end of the projection from the first fish plate, a two-piece wedge carried by said projections, said two-piece wedge consisting of a wedge piece and a retaining piece arranged end to end, said wedge piece being supported in the first fish plate, and said retaining piece being supported in the socketed fish plate and loosely engaging said wedge piece to retain it in place, said retaining piece having a threaded stem extending through said socket and a nut on its end engaging the outer side of said socketed fish plate for retaining said wedge in adjusted position.

4. A pair of fish plates for a rail joint, said fish plates having side and bottom flanges adapted to embrace a rail, one of said fish plates having spaced depending arms provided with an inclined bottom plate connecting their lower edges and projecting under its bottom flange to form a seat for a wedge, and the other fish plate of the pair having spaced depending arms connected by a bottom plate forming a socket for the end of the seat portion of the mating fish plate.

5. A pair of fish plates for a rail joint, said fish plates having side and bottom flanges adapted to embrace a rail, one of said fish plates having spaced depending arms provided with an inclined bottom plate connecting their lower edges and projecting under its bottom to form a seat for a wedge, the end of said seat portion having a tapering tenon, and the other fish plate of the pair having spaced depending arms connected by a bottom plate forming a flaring socket for the tapered end of the seat portion of the mating fish plate, in combination with means for drawing the lower portions of said fish plates together.

6. A pair of fish plates for a rail joint, said fish plates having side and bottom flanges adapted to embrace a rail, one of said fish plates having spaced depending arms provided with an inclined bottom plate connecting their lower edges and projecting under its bottom flange to form a seat for a wedge, and the other fish plate of the pair having spaced depending arms connected by a bottom plate forming a socket for the end of the seat portion of the mating fish plate, in combination with a wedge supported on said seat and provided with means for drawing it toward said socket, said means also drawing the bottom portions of said fish plates together.

7. A two-piece wedge for a rail joint, one of said pieces having a projection with an enlarged end and the other of said pieces having a slot loosely fitting said projection, whereby said pieces are held together endwise and are free to adjust themselves sidewise with respect to each other.

8. A two-piece wedge for a rail joint, one of said pieces having a projection with a transversely widened end and the other of said pieces having a slot loosely fitting said projection, whereby said pieces are held together endwise and are free to adjust themselves vertically with respect to each other.

9. A two-piece wedge for a rail joint, one of said pieces having a projection with a flaring end and the other of said pieces having a slot loosely fitting said projection, whereby said pieces are held together endwise and are free to adjust themselves sidewise and vertically with respect to each other.

10. A rail joint comprising a pair of fish plates, one of which fish plates has a projection from its lower edge with its end adapted to underlie the base of the rail and the other of which fish plates has a projection from its lower edge provided with a socket, a two-piece wedge carried by said projections, said two-piece wedge consisting of a wedge piece and a retaining piece arranged end to end, said wedge piece being supported in the first fish plate, and said retaining piece being supported in the socketed fish plate and loosely engaging said wedge piece to retain it in place, said retaining piece having a portion extending through said socket and means at its end engaging the outer side of said socketed fish plate for retaining said wedge in adjusted position.

Signed at St. Louis, Missouri, this 24th day of November, 1915.

OTTO A. FRANKE.